United States Patent

[11] 3,564,294

[72] Inventor Nigel C. Balchin
Cambridge, England

[21] Appl. No. 735,266
[22] Filed June 7, 1968
[45] Patented Feb. 16, 1971
[73] Assignee The Welding Institute
Cambridge, England
[32] Priority June 9, 1967
[33] Great Britain
[31] 26,779,167

[54] PULSE WELDING CIRCUITS
4 Claims, 3 Drawing Figs.

[52] U.S. Cl. .... 307/252; 307/296; 307/305
[51] Int. Cl. .... H03k 17/00
[50] Field of Search .... 307/252, 296, 305

[56] References Cited

UNITED STATES PATENTS

| | | | |
|---|---|---|---|
| 3,146,356 | 8/1964 | Kidwell et al. | 307/252 |
| 3,340,476 | 9/1967 | Thomas et al. | 328/127X |
| 3,365,640 | 1/1968 | Gurwicz | 307/252X |

*Primary Examiner*—Donald D. Forrer
*Assistant Examiner*—John Zazworsky
*Attorney*—Kemon, Palmer and Estabrook

ABSTRACT: In a pulses current power supply utilizing a thyristor to supply current to a load and a commutating thyristor and capacitor for switching off the load-current thyristor, a transistor is pulsed in timed relation to triggering pulses applied to the two thyristors and is so connected in the commutating thyristor circuit that if the commutating thyristor is on when the transistor conducts the transistor switches the commutating thyristor off. This overcomes the problem of miscommutation, when an arc load is first applied, for example, which would otherwise leave both thyristors conducting.

Inventor
Nigel C. Balchin
By
Kenyon, Palmer & Estabrook
Attorneys

Inventor
Nigel C. Balchin
By
Kemon, Palmer & Estabrook
Attorneys

PULSE WELDING CIRCUITS

This invention relates to pulsed current sources such as are used in some forms of consumable electrode welding. In controlled transfer arc welding, for example, the electrode is supplied with current which is raised cyclically at preset intervals from a background level (which is sufficient to melt the electrode tip but not to produce transfer of the melted material in the periods for which the background level is effective) to a higher level which produces the transfer. A convenient source of power for such controlled transfer is one which supplies a DC or rectified and partly smoothed AC for the background level, on which there is superimposed pulses of half sinusoidal waveform occurring at a frequency locked to that of the mains supply.

It is not essential to rely upon the rectification of the mains supply to provide the pulses necessary for the higher current level. A thyristor may be arranged to supply these pulses, its control electrode being fed with signals at the required pulse frequency. It is also necessary, however, to provide means for switching the thyristor off between these pulses and it is customary to reverse the applied voltage when switching off is required. The usual method of reversing the voltage applied across the thyristor is to connect another thyristor and a capacitor across the thyristor which carries the main load current and to switch this other thyristor into conduction periodically. The sudden decrease of voltage across this other thyristor, acting through the charged capacitor, effectively reverses the polarity of the voltage applied to the first thyristor for a period sufficient to stop conduction in the latter. When the first thyristor is again triggered it switches off the second thyristor in a similar manner.

When na arc load is connected to such a circuit, a very high current may be drawn during starting and as a consequence the first thyristor may not switch off when the second one is triggered. This means that both thyristors are now conducting and therefore neither is capable of switching off the other. The usual way to restore normal operation is to switch off the power supply and start again. Alternatively, a resistor of sufficiently high value to limit the current may be placed in series. However, we have found an improved method of dealing with this situation which has the additional advantage that it permits the high current which has caused the miscommutation to continue to flow while it is necessary for the arc initiation.

According to the present invention, in a circuit having a load current thyristor and a commutating thyristor and capacitor, together with means for applying triggering pulses alternately to the two thyristors, a transistor is connected in the circuit of the commutating thyristor and a periodic signal of the same frequency as the pulses applied to each of the thyristors is applied to the transistor to cause it to conduct and thereby to render the second thyristor incapable of maintaining conduction; these periodic signals are applied to the transistor after the second thyristor has been triggered into conduction and before the next triggering pulse to the first thyristor. Thus, when a faulty start has occurred and both thyristors are conducting, the next pulse to the transistor will cause conduction in the latter and thereby render the second thyristor nonconducting. The next triggering pulse to the second thyristor will thus constitute a further attempt to switch off the first thyristor, without the necessity for switching off the whole circuit.

If desired, it can be arranged that the current which flows through the transistor between the termination of conduction in the second thyristor and the retriggering of the first thyristor constitutes the background current for the arc during this period.

In order that the invention may be better understood, several examples of apparatus embodying the invention will now be described with reference to the accompanying drawings, in which.

Figure 1:
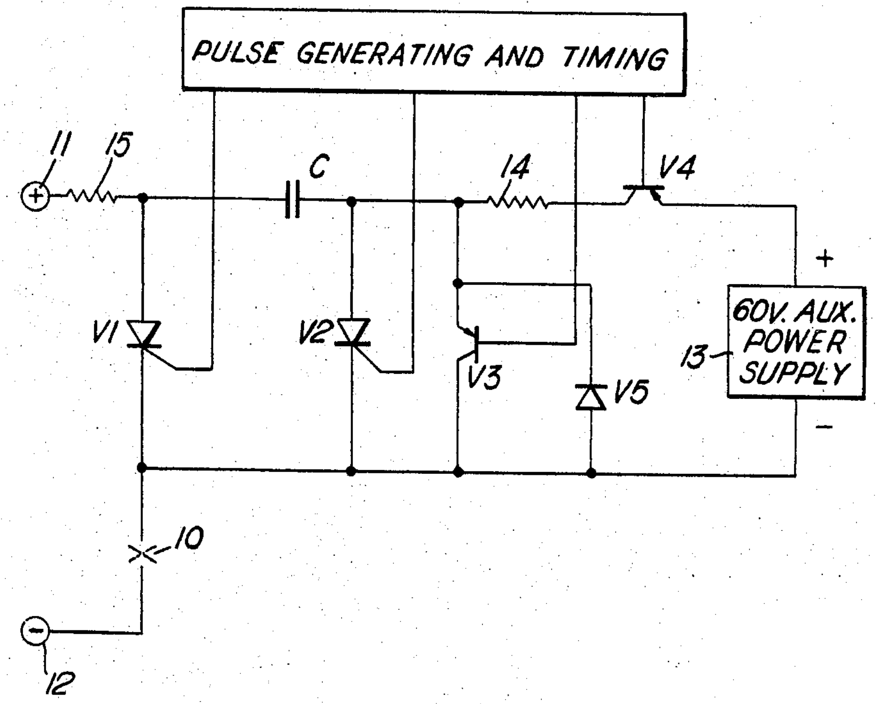
FIG. 1 is a circuit diagram of a first pulsing circuit embodying the invention.

In FIG. 1, a thyristor V1 is connected in series with the arc 10 between positive and negative terminals 11 and 12 of the principal power supply. A thyristor V2 is connected in series with a commutating capacitor C across the anode and cathode terminals of the thyristor V1. A transistor V3 has its collector and emitter electrodes connected across the anode and cathode terminals of the thyristor V2 and also across a series circuit including a 60 volt auxiliary power supply 13, a transistor V4 and a resistor 14. A diode V5 is connected across the emitter and collector electrodes of the transistor V3.

The thyristor V1 is the load current thyristor, which passes the pulses of load current to the arc 10. The resistor 15 corresponds to the resistive losses in the circuit and the impedance of the power supply, which is of 30—40 volts. The pulses of load current are initiated by applying suitably timed gating pulses to the gate electrode of the thyristor V1. To terminate a pulse of current through thyristor V1, a pulse is applied to the gate electrode of thyristor V2 to render the latter conducting. Since the commutating capacitor C will have been charged by the auxiliary power supply through the transistor V4 when the thyristor V1 began to conduct, the effect of conduction in thyristor V2 is to apply a reverse voltage from the capacitor C across the thyristor V1 and thus to make its cathode more positive than its anode. This normally terminates conduction in thyristor V1 and when V1 is turned on again it stops conduction in V2 in a similar manner.

Figure 2:
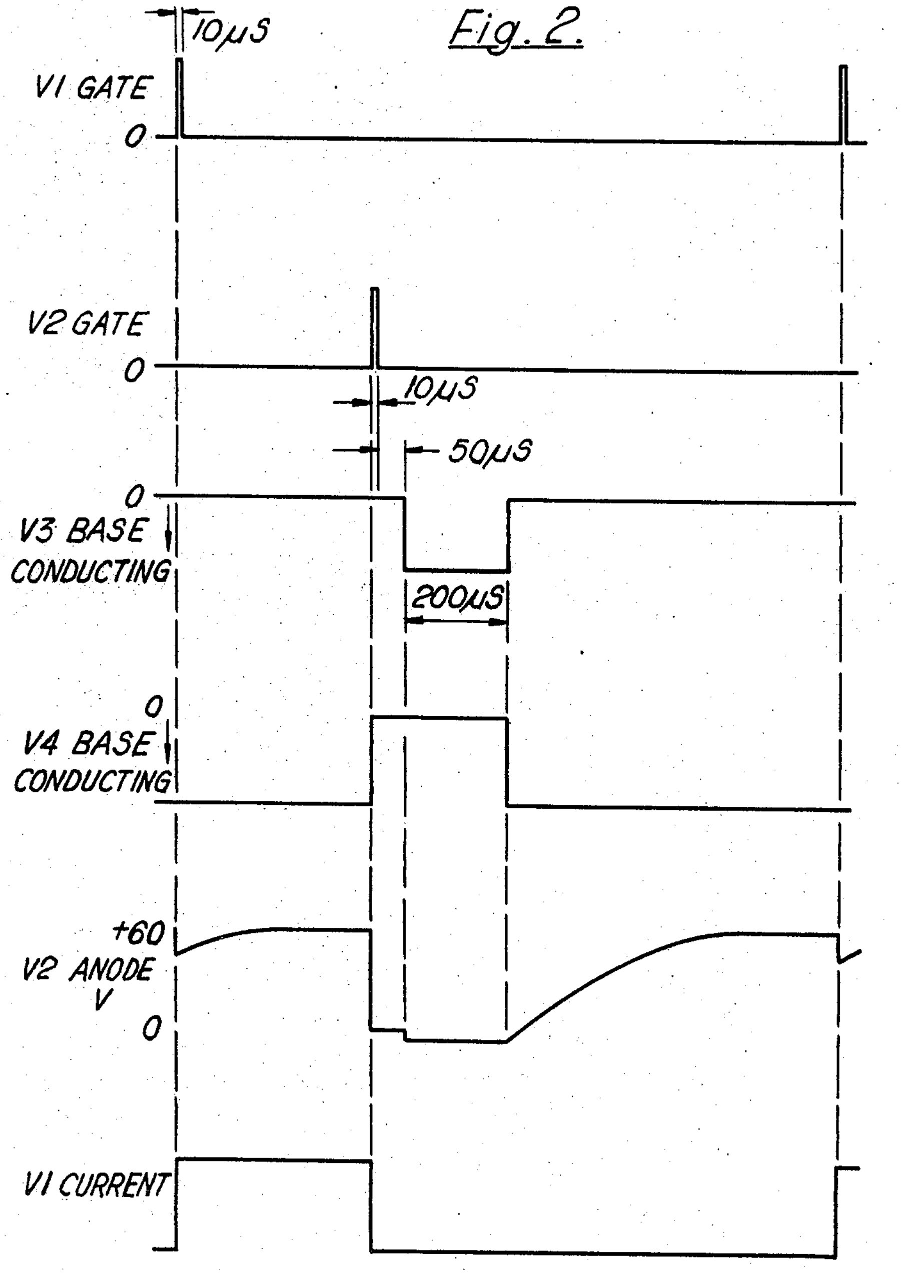
FIG. 2 is a waveform diagram showing waveforms at different points in the circuit of FIG. 1.

The gate driving pulses for thyristors V1 and V2 are shown in the first and second waveforms of FIG. 2 and the current through thyristor V1 is shown in the sixth line of FIG. 2.

As explained above, when the current through V1 is exceptionally heavy, as at starting, the first thyristor may not switch off when the second one is triggered and both thyristors will be conducting. To permit the high current to flow during the starting period and to regain control when the current drops to a normal value, we connect the transistor V3 across the thyristor V2 and the base of transistor V3 is supplied with a driving pulse after the application of a driving pulse to thyristor V2 and before the application of the next driving pulse to thyristor V1. As shown in FIG. 2, in the circuit which is being described the driving pulse for transistor V3 is delayed by 50$\mu$ secs. from the termination of the driving pulse to thyristor V2. The driving pulse for transistor V3 lasts for 200$\mu$ secs.

Transistor V4 is normally conducting and passing current from the auxiliary power supply, but is arranged to cut off the current from the auxiliary power supply while either the thyristor V2 or the transistor V3 is conducting. When V4 is nonconducting, the current flowing in V3 is reduced and its collector-emitter voltage drop is lowered and the speed of switching off the thyristor V2 is thus increased. As shown in FIG. 2, the transistor V4 is nonconducting for a period beginning with the driving pulse to thyristor V2 and ending with the termination of the driving pulse to transistor V3. The anode voltage of thyristor V2 is shown in the fifth line of FIG. 2. It should be understood that the waveforms of FIG. 2 are not to scale but simply illustrate the timing of the various pulses and waveform changes.

A diode V5 protects the transistor V3 from reverse voltage surges.

If desired, further electronic gating circuits may be added; as an example, a gating circuit may cut off the gate driving pulse to the thyristor V1 if the anode of the latter is negative with respect to its cathode, thereby protecting this thyristor. Another may ensure that the driving pulse is supplied to V3 only if the anode of thyristor V2 is at a low potential, ensuring that transistor V3 is not overloaded by switching surges. Another gating circuit may apply an extra firing signal to the gate of thyristor V2 whenever the anode-cathode voltage of the latter is more than 65 volts; since V2 is in parallel with the transistor V3, this protects transistor V3 (which in this example has a 70 volt rating) from excessive emitter-collector voltage surges. Yet another gating circuit may cut off the normal gate driving pulse to thyristor V2 if the anode-cathode voltage of the latter is less than 55 volts; this prevents V2 turning on ineffectively if for any reason the commutating capacitor is not fully charged.

With such a circuit, pulse welding is not limited to frequencies related to the frequency of the mains supply; instead, a continuous variation of frequency is possible. This is useful, for example, in a system in which it is required to generate a current pulse each time enough electrode wire has been fed to the torch to produce an ideal droplet. The amount of electrode wire can be sensed photoelectrically, for example. Thus, wire speed can be varied over a wide range while automatically maintaining ideal metal transfer conditions.

For controlled transfer welding, in which the pulses are superimposed on a background current, the latter current can be derived from the circuit shown in FIG. 1. One way of doing this is to place a suitable resistor in parallel with the thyristor V1. This resistor is thus connected directly in series with the arc across the DC supply and passes a permanent current of a value suitable for the background heating of the consumable electrode. An alternative way of supplying the background current to the arc is to connect a separate DC supply, in series with a suitable resistor, across the arc. In this case, a diode should be included in the background current circuit to prevent the current pulses intended for the arc from being diverted into the background supply path.

Figure 3:
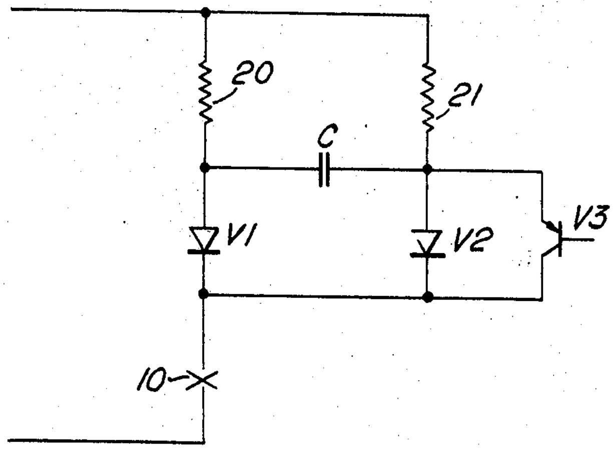
FIG. 3 shows an alternative circuit diagram for the pulsed current source.

A further form of circuit embodying the invention and supplying both the main arc current and the background current is shown in FIG. 3. In FIG. 3, a first resistor 20 is connected in series with the thyristor V1. A second resistor 21 is connected between the positive terminal and the anode of thyristor V2. As before, the transistor V3 is connected across the thyristor V2. If the transistor V3 now remains conducting until the first thyristor V1 is switched on again, the background current between the high level pulses of V1 will pass first through the thyristor V2 and then through the transistor V3. In this case an auxiliary power supply is unnecessary because the capacitor C is charged through the resistors 20 and 21. The circuit of FIG. 3, however, has the disadvantage that the resistor 20 is in the main current path and we prefer the circuit of FIG. 1 because it avoids the dissipation of power in the resistor 20.

The uses of the circuit shown are not confined to controlled transfer welding. Tests of inductors for dip-transfer welding give meaningful results only when they are carried out with electrical loads similar to those found under actual working conditions. The circuits described offer a ready means of testing such inductors with current variations of the correct order of magnitude; moreover these are identical from cycle to cycle and this simplifies observation and measurement. It is possible to use the series transistor V4 of FIG. 1 for switching off the thyristor V2 (by cutting its connection to the auxiliary power supply) without the transistor V3. However, this delays the switching-off of V2 because the capacitor continues to supply current to V2 for a period and we prefer to use the transistor V3, the shunting action of which is much more rapid.

I claim:

1. A pulsed current power supply comprising:
a first load current thyristor having anode, cathode and gate electrodes;
a circuit branch connected across the anode-cathode electrodes of said thyristor and including a capacitor and a commutating thyristor having anode, cathode and gate electrodes, said capacitor being connected in series with the anode-cathode electrodes of said commutating thyristor;
means for applying triggering pulses alternately to the gate electrodes of said two thyristors;
a transistor connected in shunt with the anode-cathode electrodes of said commutating thyristor; and
means for applying to said transistor a periodic control signal in timed relation to the triggering pulses to cause said transistor to conduct and thereby to reduce the potential across the anode-cathode electrodes of said commutating thyristor to a value below that necessary to maintain conduction, the said periodic control signals being applied to the transistor after the commutating thyristor has been triggered into conduction and before the next triggering pulse to the commutating thyristor.

2. A power supply in accordance with claim 1, including a first power supply connected to said first thyristor and further including an auxiliary power supply connected across said commutating thyristor and said transistor to charge said capacitor.

3. A power supply in accordance with claim 2, comprising a further transistor connected between said auxiliary supply, on the one hand, and said commutating thyristor and first transistor, on the other hand, and means for applying periodic control signals to said further transistor in timed relation with the triggering signals to render said further transistor nonconducting when said first transistor is conducting and thereby to increase the speed of switching off said commutating thyristor.

4. A pulsed current power supply comprising:
a first thyristor having anode, cathode and gate electrodes;
a circuit branch connected across the anode-cathode electrodes of said first thyristor and including a capacitor and a commutating thyristor having anode-cathode and gate electrodes, said capacitor being connected in series with the anode-cathode electrodes of said commutating thyristor;
means for applying triggering pulses alternately to the gate electrodes of said thyristors;
a power supply circuit for said commutating thyristor, said circuit including a power supply and a transistor, the emitter-collector path of said transistor being connected in series between said commutating thyristor and said power supply; and
means for applying to said transistor periodic control signals in timed relation to the triggering pulses to render said transistor nonconducting and thereby to switch off said commutating thyristor, the periodic control signals being applied to said transistor after said commutating thyristor has been triggered into conduction and before the next triggering pulse to said commutating thyristor.